Nov. 22, 1938.    H. A. SNOW    2,137,787
METHOD AND APPARATUS FOR ELECTRICAL MEASUREMENTS
Filed Nov. 13, 1936    5 Sheets-Sheet 1

Inventor:
Harold A. Snow,
By Potter, Pierce & Scheffler,
Attorneys.

Nov. 22, 1938.  H. A. SNOW  2,137,787
METHOD AND APPARATUS FOR ELECTRICAL MEASUREMENTS
Filed Nov. 13, 1936  5 Sheets-Sheet 2

Patented Nov. 22, 1938

2,137,787

UNITED STATES PATENT OFFICE 2,137,787

METHOD AND APPARATUS FOR ELECTRICAL MEASUREMENTS

Harold A. Snow, Mountain Lakes, N. J., assignor to Boonton Radio Corporation, Boonton, N. J., a corporation of New Jersey Application November 13, 1936, Serial No. 110,768

19 Claims. (Cl. 175—183)

This invention relates to measuring apparatus, and more particularly to apparatus for measuring with high accuracy, and at various frequencies and frequency ranges, such characteristics of high frequency circuit elements as inductance, capacitance, resistance and "figure of merit" or Q factor.

The symbol Q is commonly used to designate the ratio of reactance to resistance of a coil ($Q=2\pi fL/R$), of a condenser ($Q=\frac{1}{2}\pi fCR$), or of other circuit elements having two accessible terminals. This factor is of importance in circuit design since it constitutes, as stated, a figure of merit for the reactive element in question. The measurement of Q of a coil, or other circuit element, at high frequencies has heretofore been a complicated and tedious procedure, requiring a variety of apparatus and number of settings, readings and calculations. Errors existed in each of these operations and in each piece of apparatus, resulting in a total possible error of a considerable amount. The total of steps required in making a measurement provides an equal number of chances for making mistakes. Because of the time required for such measurments and their unreliability, the art of high frequency coil design has lagged far behind the general high frequency art.

The measurement of reactances and resistances has been more simple, but no method or apparatus for the direct measurement of the factor Q has been known.

An object of this invention is to provide apparatus for the direct measurement of the factor Q of coils and circuit elements. An object is to provide apparatus for the measurement of various characteristics of circuit elements, for use at high frequencies of various orders, in a rapid and simple manner and with a minimum of calculation. A further object is to provide a simple and compact apparatus for directly measuring the Q of coils and resonant circuits, which apparatus may be operated without the waste of time and mental effort, including computations, which have been customary in the prior art. More specifically, objects of the invention are to provide improved forms and physical constructions of various circuit elements and networks for use in measuring apparatus of the character stated.

The invention may be best understood by first considering the theory upon which the direct measurement of the factor Q is based. It is well known that in a simple resonant circuit with series impressed voltage E of the resonant frequency, there is a voltage step-up across the coil or condenser, and it can be demonstrated that this step-up or ratio of the voltage $E_L$ across the coil to the impressed voltage E is directly proportional to Q. In the case of a simple resonant circuit comprising in series an inductor of inductance L and resistance $R_L$ and a capacity of capacitance C and resistance $R_C$, the voltage $E_L$ across the inductor or condenser, at resonance, will be (very closely)

$$E_L = \frac{E\omega L}{R_C + R_L} \qquad (1)$$

Denoting the Q factors of the inductor by $Q_L, (\omega L/R_L)$ and of the capacitor by $Q_C(1/\omega CR_C)$, the equation may be written:

$$E_L = \frac{E}{\frac{1}{Q_L}+\frac{1}{Q_C}} = E\frac{Q_L Q_C}{Q_L + Q_C} \qquad (2)$$

The losses in the condenser will usually be negligible compared with the losses in the inductor so that $Q_C$ will be much greater than $Q_L$. In this case, Equation 2 becomes $$E_L = E Q_L \qquad (3)$$

or, in other words, the voltage step-up is directly proportional to the Q of the coil.

It therefore follows that the Q of a coil may be measured in terms of $E_L$, i. e. by a voltmeter which measures $E_L$ at resonance for a constant input voltage E of the resonant frequency, the scale of the voltmeter being graduated directly in Q values if the apparatus includes means for regulating the input voltage to the standard value E.

The above and other objects and advantages of the invention will be apparent from the following specification when taken with the accompanying drawings, in which.

Figure 1:
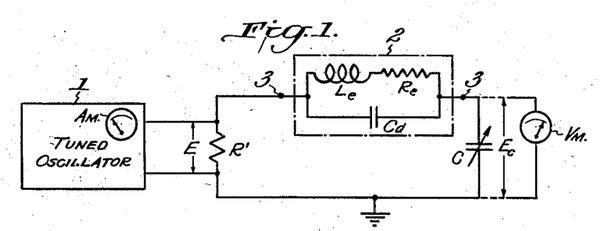
Fig. 1 is a schematic diagram illustrative of the fundamental circuit of the invention.

In the Fig. 1 diagram, the reference numeral 1 identifies a tuned oscillator having an ammeter AM for measuring the current output which flows through the resistor R' to establish a potential E across the same. Resistor R' is a series element in a resonant circuit comprising the variable condenser C and an inductor having two terminals, the inductor being indicated by the dotted line rectangle 2 and being shown schematically as the impedances, between terminals 3, 3, of an effective inductance $L_e$, and effective series resistance $R_e$ and a distributed capacitance $C_d$.

The series voltage E establishes a current flow in the resonant circuit which produces a step-up or increased voltage $E_c$ across the condenser C. Analysis of the circuit will show that the "effective Q" of the inductor, at resonance, is $$Q_e = \frac{E_c}{E} = \frac{\omega L_e}{R_e} \qquad (4)$$

In the case of a coil, the difference between the true Q and the effective $Q_e$, as determined by measuring $E_c$, depends upon the distributed capacity $C_d$ of the coil and may be expressed very closely by:

$$Q = Q_e\left(1 + \frac{C_d}{C}\right) \qquad (5)$$

From the practical standpoint, this difference is of little importance as the minimum capacitance C used to tune a coil is usually much greater than the distributed capacitance so that the maximum difference between Q and $Q_e$ will, in general, be not more than 5 to 10% when measured with the minimum tuning capacitance.

According to the present invention, the effective $Q_e$ of a coil is measured directly by injecting a predetermined voltage E, of desired frequency, in series with a resonant circuit comprising the coil and a low-loss variable condenser, and measuring the step-up voltage $E_c$ with a voltmeter having a scale calibrated in values of Q. The construction of apparatus for carrying out this process calls for the design of a measured source of voltage E which has at all frequencies a resistance R' that is negligible in comparison with that of the resonant circuit, and of a voltmeter having negligible power consumption.

A non-inductive resistor of low resistance value may be used as the measured source of voltage. A number of constructions that are satisfactory at frequencies as high as 50 megacycles are shown in Figs. 2 to 5c, inclusive.

Figure 2:
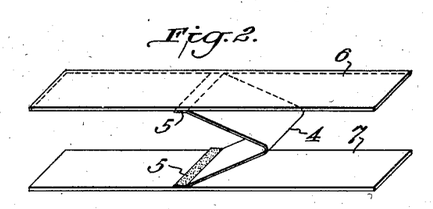
Fig. 2 is a greatly enlarged perspective view, illustrating a coupling resistor for use in the Fig. 1 circuit.
Figure 3:
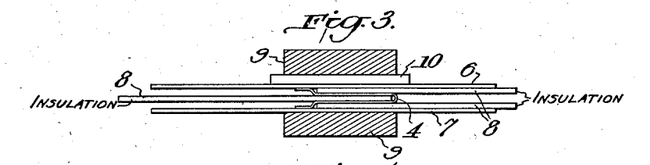
Fig. 3 is a side elevation, on a similar enlarged scale, of the resistor.

The enlarged perspective view, Fig. 2, shows the essential parts of one non-inductive resistance in expanded form. A small very thin ribbon 4 of resistance material, of substantially zero temperature-resistance coefficient, is bent into U-shape and its ends 5 are soldered or otherwise secured to the conducting strips 6, 7 which act as terminals. Very thin layers 8 of low-loss insulating material, such as thin mica, are placed between and at each side of the sections of the resistance sheet 4, and the assembly is clamped between strips 9. A layer of insulation 10 is preferably arranged between the terminal strip 6 and the clamp 9, while the terminal strip 7 is grounded on the clamp. As stated above, these views are to a greatly enlarged scale as the total thickness of the resistance ribbon, insulation and terminal strips (exclusive of the clamp 9) may be less than 0.008 inch for a resistance of 0.04 ohm.

Figure 4:
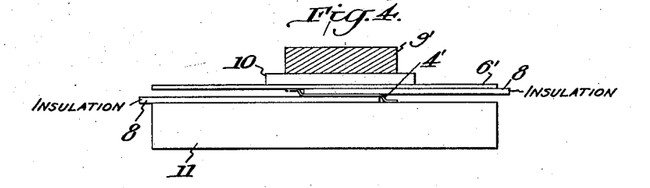
Fig. 4 is a side elevation of an alternative resistor construction.

A simpler construction, as shown in Fig. 4, includes a short, flat resistance ribbon 4' arranged between a conducting base 11 and an upper terminal strip 6'. The ends of the ribbon are connected to the base 11 and strip 6', and insulating layers 8 are sandwiched between the resistance and its terminals. The parts are clamped upon the base 11 by a clamp strip 9' that is insulated from the strip 6'.

Figures 5A, 5B:
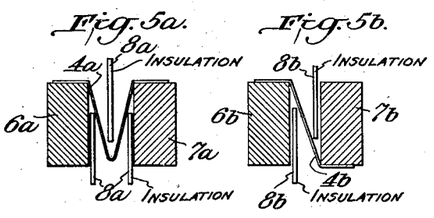
Figs. 5a to 5c are somewhat schematic views, in cross-section, of other coupling resistor constructions.
Figure 5C:
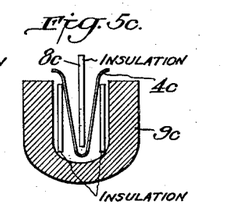

The alternative arrangements of the Fig. 5 views are also greatly enlarged and with the parts in somewhat expanded relation. The U-shaped resistance ribbon 4a of Fig. 5a is arranged transversely of its terminal strips 6a, 7a with its central portions insulated from each other and the terminals by thin insulating layers 8a. The Z-shaped resistance ribbon 4b of Fig. 5b has its ends secured to the top of terminal strip 6b and the bottom of terminal strip 7b, with inserted insulating layers 8b. The bent or multiple resistance strip 4c of Fig. 5c is insulated by layers 8c and clamped between the sides of a U-shaped clamp 9c of malleable metal.

Figure 6:
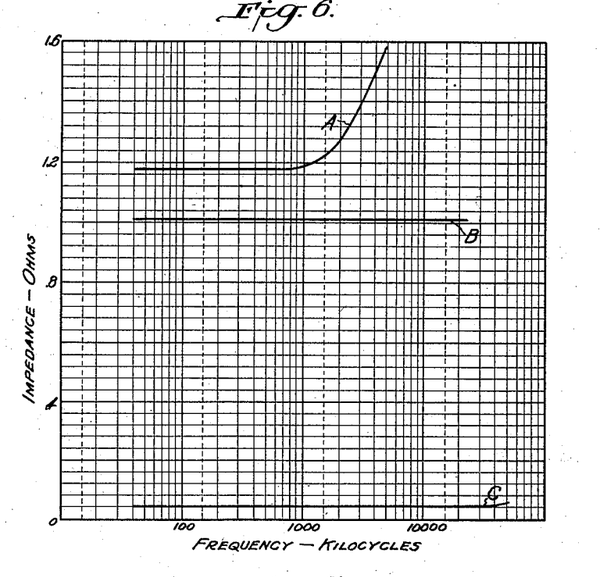
Fig. 6 is a curve sheet illustrating the relation between impedance and frequency for resistors having a low, and a negligible, inductance.

The characteristic of the new resistors is shown in Fig. 6 in comparison with that of the known bi-filar "non-inductive" resistance. Curve A shows the variation, with frequency, of the ohmic impedance of a bi-filar resistor having a low frequency resistance of 1.18 ohms and an inductance of 0.03 microhenry. It will be noted that the impedance rises rapidly with frequency above about 700 kilocycles. Curve B shows the impedance-frequency characteristic of an approximately 1 ohm resistor that was of good design with respect to freedom from inductance, but a resistance of this order is too high for measurements of Q in a low resistance resonant circuit. Curve C is typical of the impedance-frequency characteristic of resistors, as described above, that may be used in a Q-meter at frequencies of the order of 50 megacycles. The resistance is of the order of 0.04 ohm, and the inductance is so low that accurate measurement is not possible. The inductance is probably of the order of a few hundred-thousandths of a microhenry, as the ohmic impedance remains constant up to 30 megacycles.

The current flow through such a resistor may be measured by a thermo-couple ammeter which, as is well known, may be calibrated directly in terms of the voltage drop E that is produced across the resistor by the current actuating the ammeter. The current supply is from an oscillator that may be tuned over one or more frequency ranges and known methods of designing a multirange oscillator may be employed. The new resistors, when combined with the oscillator and current-responsive instrument thus satisfy the design requirements for the measured voltage source E in series with the resonant circuit.

Various types of vacuum tube voltmeters could be employed for measuring the step-up voltage $E_c$ across the condenser of the resonant circuit. But many prior designs call for balancing adjustments for each measurement and, in general, the calibrations of the voltmeter proper or measuring instrument are not independent of the tube characteristics and power supply variations.

Figures 7, 8:
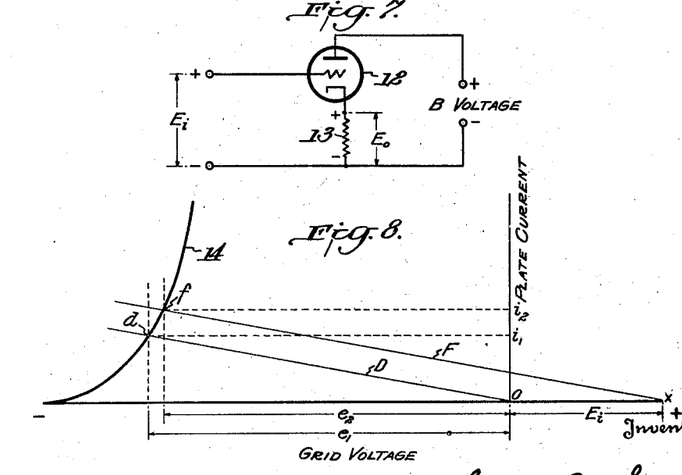
Fig. 7 is a scrematic diagram of a novel type of vacuum tube voltmeter incorporated in this invention.
Fig. 8 is a typical curve sheet, plotted between grid voltage and plate current, for a voltmeter such as shown in Fig. 7.

The vacuum tube voltmeter contemplated for inclusion in the Q-meter is free from these objections, and its method of operation will be apparent from a consideration of the schematic circuit, Fig. 7, and the grid voltage-plate current curve, Fig. 8, of the tube 12 of that circuit. A resistor 13 is included in the cathode circuit, i. e. is traversed by the plate current to produce a voltage drop that applies a negative bias between the grid and cathode. When the input voltage $E_i$ is zero, this voltag drop across resistor 13 is the only voltage applied to the grid, and this may be represented by the line D drawn through the origin of Fig. 8 with a slope equal to the ohmic resistance R of resistor 13. The intersection $d$ of line D and the tube characteristic 14 determines the value of the plate current $i_1$ flowing through the resistor 13, and the corresponding voltage, $e_1 = i_1 R$, established by that current across resistor 13 is equal to the bias on the grid; if a direct current voltage $E_i$ is impressed between grid and cathode, with the positive side at the grid, a new resistance line F may be drawn which intersects the axis at the positive voltage value $E_i$. The intersection $f$ of line F and characteristic 14 determines the new value $i_2$ of plate current which produces a voltage drop across resistor 13 equal to $i_2 R$. The difference in potential $e_2$ between grid and cathode is, from inspection of Figs. 7 and 8, $$-e_2 = i_2 R - E_i \qquad (6)$$

The change in voltage across resistor 13, which may be termed the output voltage $E_o$ corresponding to the input voltage $E_i$, may be obtained by transforming equation (6) to:

$$E_i - e_2 = i_2 R \qquad (7)$$

and subtracting the initial voltage drop across resistor 13

$$-e_1 = i_1 R \qquad (8)$$

from Equation 7: or $$E_0 = i_2 R - i_1 R = E_i - (e_2 - e_1) \qquad (9)$$

It is apparent that if $(e_2 - e_1)$ can be neglected, the output voltage $E_o$ across resistor 13 due to the input voltage $E_i$ would be $$E_0 = i_2 R - i_1 R = E_i \qquad (10)$$

Equation 10 shows that the circuit of Fig. 7 provides an arcuate translation of the input voltage $E_i$ to an equal voltage $E_o$ across the resistor 13 if the difference between $e_1$ and $e_2$, Fig. 8, can be neglected. This quantity depends upon the slope of the tube characteristic, which is the mutual conductance or transconductance $S_m$ of the tube. Referring to Fig. 8, the transconductance in the operating region is $$S_m = \frac{i_2 - i_1}{e_2 - e_1} \qquad (11)$$

from which:

$$e_2 - e_1 = \frac{i_2 - i_1}{S_m} \qquad (12)$$

Equation 12 is the amount of error introduced by the slope of the characteristic and, expressing the error as the ratio of $E_o$ to $E_i$, it can be demonstrated that, when $$\frac{e_2 - e_1}{E_i}$$

is a small fraction, $$\frac{E_o}{E_i} = 1 - \frac{1}{RS_m} \qquad (13)$$

Assuming that resistor 13 has a resistance $R = 100{,}000$ ohms and $S_m = 1000$ micromhos, Equation 13 reduces to $$\frac{E_o}{E_i} = 1 - \frac{1}{100{,}000 \times 1000 \times 10^{-6}} = 0.99 \qquad (14)$$

The measured value of $E_o$ is therefore equal to the value of the input voltage $E_i$ within an error of 1% and, if the resistor 13 has a value of $10^6$ ohms, the error will be only 0.1 per cent.

The circuit of Fig. 7 may also be used as a rectifier for translating alternating input voltages $E_i$ into direct current output voltages $E_o$ across resistor 13 by using a grid potential appropriate for anode bend rectification. The selection for the circuit of Fig. 7 of a tube and a resistor 13 which correspond to a small value for $1/RS_m$ provides a stage in which the output voltage, across resistor 13, is equal to the input voltage with high accuracy, and this relationship is substantially independent of the tube characteristic so long as the value $S_m$ at the operating range remains above a predetermined value. Tubes of the high mu type, with high input impedances, are appropriate. Small values of alternating input voltages are not measured accurately since the grid is generally biased close to "plate current cut-off" for efficient rectification but, as soon as the alternating voltage peaks swing the grid voltage far enough to operate in a region of higher $S_m$, the relation of $E_o$ to $E_i$ becomes accurately linear and practically independent of the tube characteristic.

Figure 9:
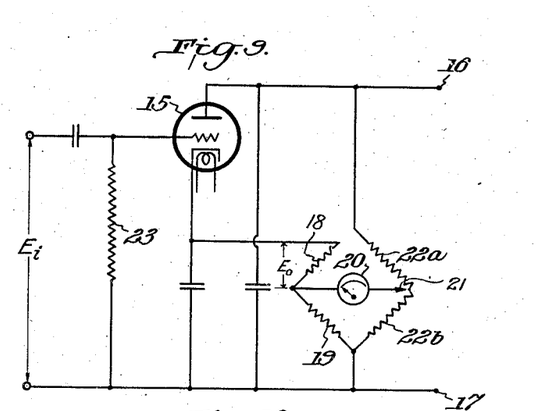
Fig. 9 is a circuit diagram of an alternating current vacuum tube voltmeter of the type shown in Fig. 7.

Practical considerations require a plate current supply from an alternating current source and, in most instances, the source voltage is not closely regulated. A voltmeter which is substantially independent of supply voltage fluctuations is shown in Fig. 9. The rectified plate current voltage for tube 15 is connected between the terminals 16, 17, in the usual manner, and the cathode circuit includes fixed resistors 18 and 19 in series, the voltmeter 20 being connected between the junction of resistors 18, 19 and a sliding contact 21 that is adjustable along a potentiometer 22a, 22b that is shunted across terminals 16, 17. A grid resistor 23 is connected between the grid and ground to apply an initial bias appropriate for anode bend rectification, this bias being produced by plate current flow through resistors 18 and 19. Resistor 18 corresponds to the resistor 13 of Fig. 7, and the resistive bridge with adjustable tap 21 provides a reversed current to the instrument 20 to balance out the plate current normally flowing through the instrument when $E_i$ is zero. Voltmeter 20 and the voltage supply are conjugate arms of the bridge network, and this balance adjustment which provides for a direct reading of $E_o$ values is therefore independent of the supply voltage. Changes in supply voltage tend to change the plate current flow, but this change in plate current results in a change in grid bias, as developed across resistors 18, 19, in a sense to oppose the change in plate current and, due to the mu of the tube, the plate current flowing through the meter remains substantially constant over a range of plate supply voltage.

Figure 10:
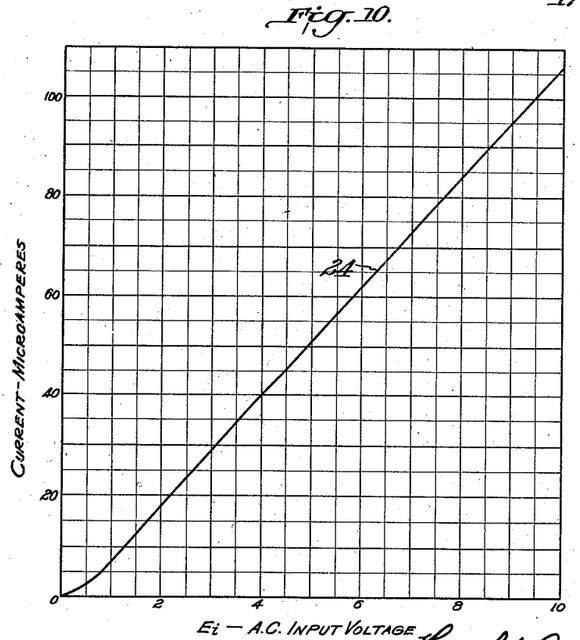
Fig. 10 is a curve sheet illustrative of the performance of the Fig. 9 voltmeter.

The curve 24 of Fig. 10 was plotted between alternating input voltage $E_1$ and the output current. Above a fraction of a volt input, the curve is substantially linear and the output current therefore produces a voltage drop across a plate circuit resistor that is proportional to the input voltage.

Figure 11:
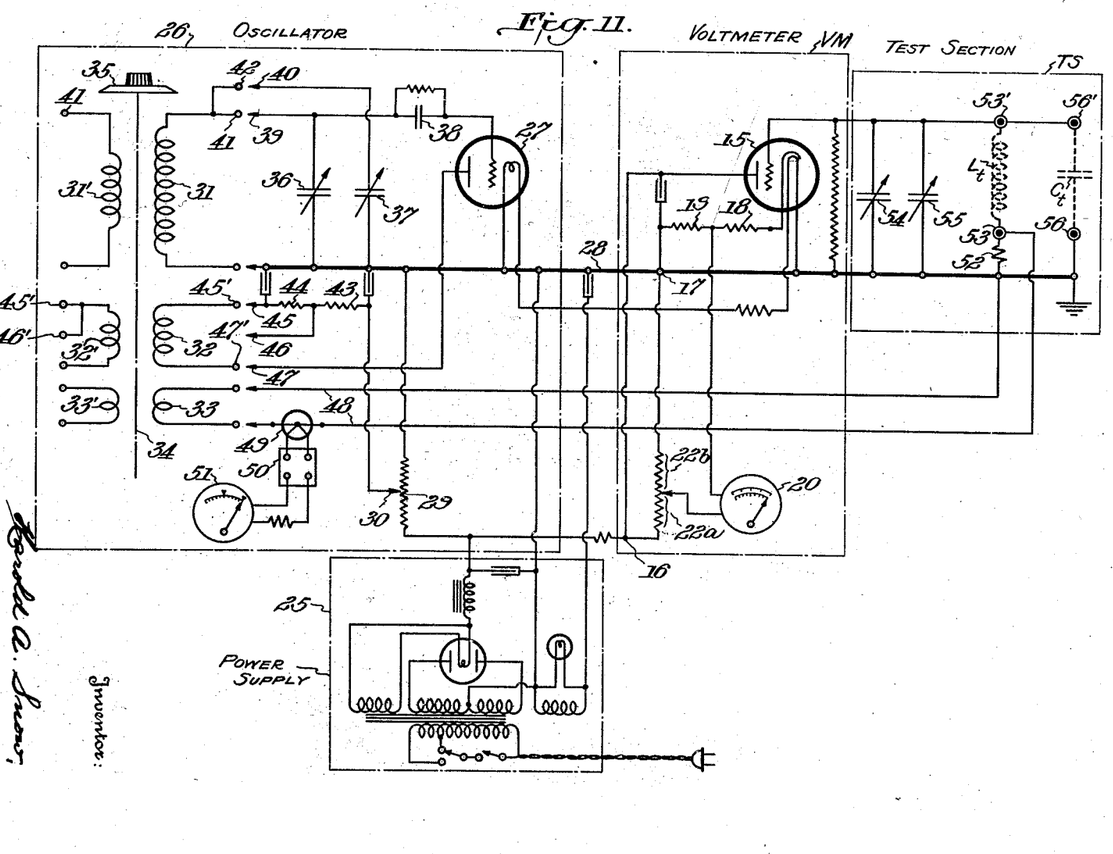
Fig. 11 is a circuit diagram of an embodiment of the invention.

A practical multirange Q-meter, as shown in Fig. 11, comprises the four main sections which are indicated by the dotted line rectangles, i. e. a power supply 25, a tuned oscillator 26, a voltmeter VM, and a test section TS for receiving the element that is to be measured. The power supply 26 is shown as a rectifier-filter unit for operation on a 110 volt alternating current line, but the construction is conventional and need not be described in detail.

The design requirements of the oscillator are stability of operation and accurate calibration of frequency adjusting means over all operating ranges, and a meter for measuring the output current. One terminal of the filamentary cathode of an oscillator tube 27 is grounded on the chassis or mounting plate, indicated by the heavy line 28, and the voltage divider 29 is connected between the ground 28 and the positive voltage terminal of the plate supply, the tap 30 of the voltage divider constituting means for adjusting the oscillator output.

The range-changing system consists of the known rotating drum assembly of a plurality of sets of grid circuit coils 31, 31', plate circuit coils 32, 32' and output coils 33, 33'. The coil assembly is rotated about an axis 34 by a range-adjusting knob 35 and the coils have terminals that engage a set of stationary contacts to connect the desired set of coils to the tube 27 and associated elements. The adjustable capacitance for tuning the input or grid coil is provided by condensers 36, 37 that may have maximum capacities of about 200 and 450 micromicrofarads, respectively. Condenser 36 is connected between ground 28 and the grid leak-condenser combination 38, and the contact 39 of the coil system is also connected to the high potential side of condenser 36. Condenser 37 is connected between ground 28 and a switch contact 40. Grid coil 31 has dual terminals 41, 42 at the high potential side for engaging contacts 39, 40, thus connecting both tuning condensers across the coil, while grid coil 31' has a single terminal 41 for connecting only the smaller condenser 36 in circuit. The total tuning capacitance is used with coils for frequency ranges below about 12 megacycles while only the smaller capacitance is used with coils for higher frequencies. A similar switching system is employed for establishing different connections for plate coils in different ranges. The voltage tap 30 is connected through resistors 43, 44 to a switch contact 45, the junction of the resistors is connected to contact 46, and the plate is connected to contact 47. Plate coils 32 for some ranges have contacts 45', 47' for connecting the total resistance 43, 44 in the plate circuit, while other coils 32' have terminals 45', 46', 47' for excluding the resistor 44. All output coils 33, 33' have terminals of identical arrangement for connecting the selected coil across the output circuit leads 48. A thermocouple 49 is included in one lead 48, the couple being connected through a radio frequency filter 50 to a sensitive milliammeter 51. The scale of the ammeter is calibrated in terms of the voltage drop which that current flow establishes across the coupling resistor of the resonant circuit. The scale has one or more index marks corresponding to predetermined values of the input voltage E introduced into the resonant circuit; each of these values of E corresponding to a separate scale of graduations for the measured step-up voltage $E_c$, Fig. 1.

The test section TS includes the coupling resistor 52 (corresponding to resistor R' of Fig. 1) that is connected across the output circuit leads 48 of the oscillator, one side of the resistor being grounded on the shield 28. The other side of the resistor 52 is connected to one of the terminals 53 across which the coil or inductor $L_t$ is to be connected. A pair of tuning condensers 54, 55 of different size are connected between the grounded side of the resistor 52 and the second test coil terminal 53'. A second set of test terminals 56, 56' are connected to the ground line 28 and to terminal 53', respectively. A condenser $C_t$ which is to be tested may be connected across these terminals.

The elements of the vacuum tube voltmeter VM are identical with those of Fig. 9, and are identified by corresponding numerals but will not be described in detail with reference to Fig. 11. The low potential terminal 17 of the plate voltage supply is connected to the ground line 28, and the grid and cathode of the tube 15 are connected across the tuning condensers 54, 55 of the test section. The voltmeter 20 has two scales of Q values when, as shown, the output meter 51 of the oscillator has markings for two predetermined potentials across resistor 52. In the commercial models, two ranges of Q values of 0–250 and 0–500 have been used but the method and apparatus of this invention are not limited to any particular range or ranges of operation.

Figure 12:
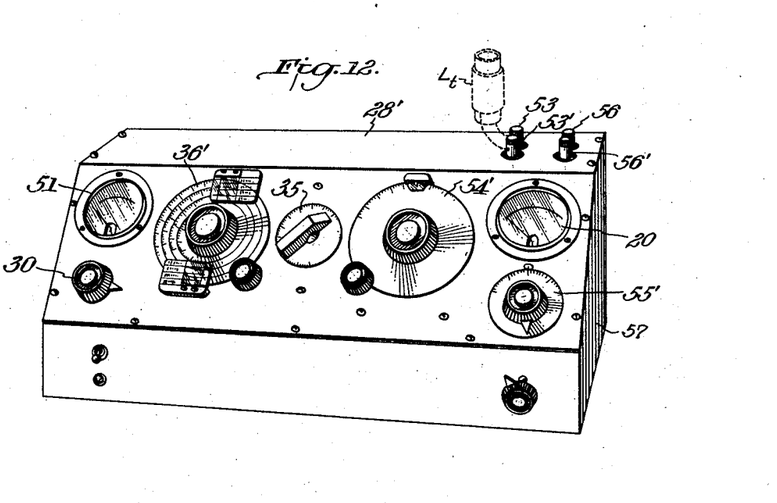
Fig. 12 is a perspective view of an embodiment of the invention.
Figure 13:
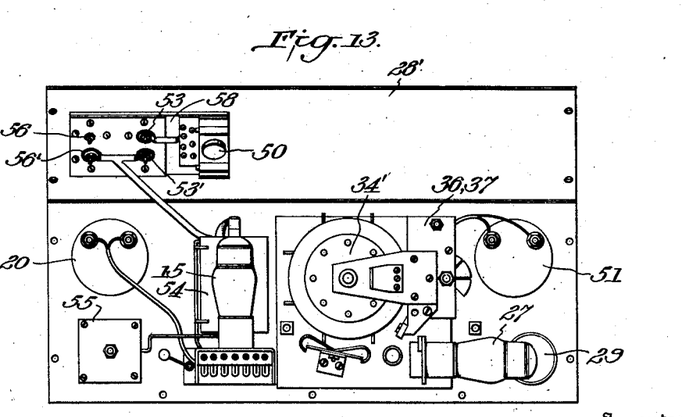
Fig. 13 is an interior view of the chassis and essential parts of the embodiment shown in Fig. 12.

A convenient and practical assembly of the Fig. 11 circuit is illustrated in Figs. 12 and 13. The power supply unit (not shown) is mounted within and on the base of the cabinet 57 and all other elements are carried by a metal plate 28' that forms the top and sloping front of the cabinet. The coupling resistor 52 and the thermocouple and filter assembly 49, 50 are mounted on a metal plate 58, and the test coil terminals 53, 53' and the test-condenser terminals 56, 56' are carried by a strip of insulating material, not shown, that is secured to plate 58. The terminals extend above the top of the cabinet at the right side, with the meter 20 of the voltmeter unit just below these terminals on the sloping front of the cabinet. The knob and calibrated dial 55' of the smaller tuning condenser 55 are below the meter 20, and the knob and dial 54' of the main tuning condenser 54 are to the left on the sloping panel. The range selecting knob 35 of the multirange coil assembly is approximately at the center of this panel, and the large multirange dial 36' of the oscillator tuning condensers 36, 37 lies further to the left, the meter 51 for measuring the input voltage to the coupling resistor being in the upper left corner above the knob 30' that controls the setting of the tap 30 on the voltage divider 29. Some of the shielding is omitted from Fig. 13 for the clearer illustration of the arrangement of the circuit elements. The location of the meters, coil assembly 34' and condensers is determined by the location of their indicating or control parts on the sloping panel. The oscillator tube 27 is mounted horizontally and spaced from the panel 28' to clear the output voltage control or potentiometer 29, 30. The voltmeter tube 15 is mounted at the back of the main tuning condenser.

The method of operation is as follows. A coil $L_t$ to be measured is connected between terminals 53, 53', the oscillator is set at the desired frequency, the oscillator output is adjusted by knob 30' to the predetermined value (indicated by meter 51) corresponding to measurements in the 0–250 Q range, and the coil $C_t$ is resonated by the tuning condensers 54, 55. Resonance is indicated by a maximum deflection of the meter 20, and this maximum deflection is the effective Q of the coil. If the Q is above 250, the oscillator output must be set to the lower input voltage marking. The tuning condenser dials 54', 55' indicate the total tuning capacitance of the test circuit except that added by the coil and its leads.

The true Q of a coil may be determined by Equation 5 by measuring the distributed capacity $C_d$ of the coil. Fairly accurate results for capacitances above about 10 micromicrofarads may be had by setting the test circuit capacitance to about 50 micromicrofarads, and resonating the test circuit by adjusting the oscillator frequency; then setting the oscillator to exactly one-half that frequency and resonating the test circuit by adjusting the condensers 54, 55. Designating the two test circuit capacitances as $C_1$, $C_2$, respectively, the distributed capacity is:

$$C_d = \frac{C_2 - 4C_1}{3} \quad (15)$$

The effective series resistance of a coil may be computed by first measuring Q, as described, and recording the values of the resonant frequency $f$, test circuit tuning capacitance $C_1$, and the $Q_e$ of the coil. The resistance $R_s$ is then:

$$R_s = \frac{1.59 \times 10^8}{fC_1 Q_e} \quad (16)$$

The effective inductance may be computed from the same recorded values, with $C_1$ about 400 micromicrofarads, as $$L_s = \frac{2.53 \times 10^{10}}{f^2 C_1} \quad (17)$$

When $C_1$ is set to exactly 400 micromicrofarads, this reduces to $$L_s = \frac{63.2 \times 10^6}{f^2} \quad (18)$$

The electrical characteristics of other circuit elements may be obtained, by computation, from measurements made with this apparatus. The capacitance of small condensers may be measured, for example, by resonating a coil in the test circuit, then connecting the test condenser $C_t$ between terminals 56, 56' and re-resonating the circuit. The difference in the readings of the tuning condenser settings is equal to the capacitance of the condenser $C_t$. The effective capacitance or inductance of resistors may be measured in a similar manner.

The usual precautions must be taken in making measurements with this apparatus. Short leads should be used in connecting coils or the like to the terminals, and stray fields should be eliminated.

The illustrated embodiment is the preferred form of the invention, but it will be apparent that there is considerable latitude in the design and construction of the parts which constitute the test circuit and the associated voltage input and measuring elements.

I claim:

1. The method of determining the relative Q values of a plurality of inductors which are successively connected in series with a circuit of negligible resistance comprising an adjustable condenser in series with a measured source of alternating voltage, which method comprises maintaining the voltage output of the source at the same value as the inductors are successively connected into the circuit, adjusting the capacitance of the condenser to resonate with the inductors as they are successively connected into the circuit, measuring the voltages developed across the condenser when resonated with the respective inductors included in the circuit, and evaluating the Q values of the several inductors in direct proportion to the measured voltages corresponding to those inductors.

2. The method of measuring the Q of an inductor in a test circuit including a measured source of high frequency voltage of adjustable frequency, an adjustable condenser in series with said source, and a voltmeter of high input impedance at high frequencies connected across said condenser, said method comprising connecting the inductor in series with said voltage source and condenser, adjusting the frequency of said source to a desired value, adjusting said condenser to resonate with the inductor at that frequency, measuring the voltage input of said source and the corresponding voltage developed across the condenser, and evaluating the effective $Q_e$ of the inductor at the selected frequency as the ratio of condenser voltage to source voltage.

3. The method as claimed in claim 2, including the steps of converting the effective $Q_e$ of the inductor to the true Q by measuring the distributed capacitance of the inductor, and multiplying the $Q_e$ value by the factor consisting of the sum of said distributed capacitance and the effective capacitance of the adjustable condenser at resonance divided by said effective capacitance.

4. Apparatus for measuring an electrical characteristic of a reactive impedance, comprising a measured source of high frequency voltage, an adjustable condenser in series with said voltage source, a voltmeter connected across said condenser, and terminals connected respectively to said source and condenser, said terminals being adapted to be bridged across by a reactive impedance to complete a closed loop circuit including said condenser and voltage source, and said voltmeter comprising an instrument having a scale calibrated directly in Q values corresponding to a predetermined value of voltage input into said loop circuit by said source of high frequency voltage.

5. In apparatus for measuring an electrical characteristic of a circuit element for use at high frequencies, the combination with a tunable oscillator having a resistor in the load circuit thereof, means for measuring the voltage drop across the resistor, and means for adjusting said voltage drop over a range of values, of an adjustable condenser having one side connected to one end of said resistor, terminals connected respectively to the other side of said condenser and to at least one end of said resistor, and a voltmeter connected across said condenser, a pair of said terminals being adapted to be bridged across by a circuit element to complete a closed loop circuit with said resistor and said condenser.

6. Apparatus as claimed in claim 5, wherein said resistor has a negligible inductance at all frequencies within the tuning range of said oscillator and a resistance negligible in comparison to the resistance of said circuit element.

7. In a device adapted to measure the ratio of the inductive impedance to the resistance of a specimen inductance, the combination of a variable condenser, an impedance connected in series with said condenser and of a value small in comparison to the resistance of the specimen inductance, means for establishing a signal voltage across said impedance, means for connection to the specimen inductance to include the same in a closed loop circuit with said condenser and said impedance, and means for simultaneously measuring the voltage across said condenser and across said impedance.

8. In apparatus for measuring an electrical characteristic of a specimen inductance, the combination of a source of adjustable frequency signal, a resistor and a condenser connected in series, means for coupling said resistor with said signal source, means for connecting a specimen inductance to said resistor and condenser to form therewith a closed loop, and means for simultaneously measuring the signal voltage across said resistor and across said condenser.

9. In electrical measuring apparatus, the combination with a tunable source of high frequency voltage, said source including an impedance for connection into an external circuit, means for measuring the voltage drop across said impedance, and means for adjusting said voltage drop over a range of values, of an adjustable condenser having one side connected to one end of said impedance, terminals connected respectively to the other side of said condenser and to at least one end of the impedance, and a voltmeter connected across said condenser, a pair of said terminals being adapted to be bridged by a specimen circuit element to complete a closed loop circuit with said impedance and said condenser.

10. In apparatus for measuring the Q of a coil, the combination with an adjustable condenser, a voltmeter connected across said condenser, a resistor of low resistance value and negligible inductance having one end connected to one side of said condenser, and coil-receiving terminals connected respectively to the other end of the resistor and the other side of the condenser, of a multirange tunable oscillator for supplying current to said resistor, means for adjusting the current output of the oscillator, and means for indicating the voltage drop produced across said resistor by the current output of said oscillator.

11. Apparatus for measuring electrical characteristics of circuit elements and of the type including an adjustable condenser, a voltmeter connected across said condenser, a resistor in an oscillator output circuit and connected to said condenser, and means for connecting an inductor in series with said resistor and condenser, characterized by the fact that said resistor comprises a short metallic ribbon between and having its ends electrically connected to conducting strips, thin insulating sheets between said ribbon and said strips, and means for holding the parts in close assembled relation.

12. Apparatus as claimed in claim 11, wherein the metallic ribbon has a substantially zero temperature-resistance characteristic and a resistance of substantially less than one ohm.

13. In apparatus for measuring a characteristic of an inductor, the combination with means for connection to the inductor to form a series tunable circuit in series with a measured source of alternating voltage, of means for measuring the voltage step-up when said circuit resonates at the frequency of the source voltage; said means comprising a vacuum tube voltmeter including a tube having a grid cooperating with a cathode and plate, a resistor in the plate-cathode circuit, a grid-resistor connected between the grid and said first resistor to bias said tube for rectification, a meter connected across said first resistor to measure plate current, and adjustable means for balancing out of said meter the normal plate current flow therethrough corresponding to zero alternating voltage between grid and cathode.

14. Apparatus as claimed in claim 13, wherein said measured source of alternating current includes means for adjusting the current output to a predetermined magnitude, and said meter is calibrated directly in values of Q.

15. Apparatus for measuring an electrical characteristic of a high frequency circuit element, said apparatus comprising a cabinet, a rearwardly sloping front panel for said cabinet, an oscillator carried by said panel and including a frequency-adjusting element having a dial arranged approximately centrally of said panel, an oscillator output meter and an output adjusting control carried by said panel at the left of said dial, a test circuit coupled to said oscillator and including a condenser mounted on the rear of said panel with the dial thereof at the right of said oscillator dial, and voltmeter means connected across said condenser and including a meter carried by said panel at the right of said condenser dial, said test circuit including a pair of terminals at the exterior of said cabinet for making connection to the circuit element to be tested.

16. Apparatus as claimed in claim 15, wherein said terminals project above the top of said cabinet adjacent the right side thereof.

17. Apparatus as claimed in claim 15, wherein said panel and the top of said cabinet are formed of a single metal plate, and said terminals are mounted on an insulating strip secured to the metal plate, said terminals projecting through openings in the top of the cabinet adjacent the right side thereof.

18. In apparatus for measuring high frequency voltages, a voltmeter comprising a tube having a grid cooperating with a plate and cathode, a plate circuit including a resistor, means connecting the grid to said resistor to bias the grid by the voltage drop across said resistor, and a meter for measuring the voltage drop established across said resistor by an alternating voltage impressed between grid and cathode.

19. The invention as claimed in claim 18, wherein a voltage divider is connected between the plate and the cathode terminal of said resistor, and said meter is connected between an adjustable tap on the voltage divider and said resistor, whereby the normal plate current flow through said meter may be balanced out at zero alternating input voltage on the tube.

HAROLD A. SNOW.